(12) United States Patent
Briggs

(10) Patent No.: US 7,485,044 B2
(45) Date of Patent: Feb. 3, 2009

(54) SHAFT ASSEMBLY AND METHOD OF MANUFACTURE THEREOF

(75) Inventor: Roger L. Briggs, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 214 days.

(21) Appl. No.: 11/059,820

(22) Filed: Feb. 17, 2005

(65) Prior Publication Data

US 2006/0183561 A1 Aug. 17, 2006

(51) Int. Cl.
*F16C 3/00* (2006.01)
(52) U.S. Cl. .......................................... 464/16; 464/183
(58) Field of Classification Search .................. 464/16, 464/156, 158, 182, 183; 192/70.2; 74/468; 72/352–361, 370.03, 370.06, 370.1, 370.21, 72/714
See application file for complete search history.

(56) References Cited

U.S. PATENT DOCUMENTS

| | | | | |
|---|---|---|---|---|
| 1,732,965 A | * | 10/1929 | Carhart | 192/70.2 |
| 1,966,053 A | * | 7/1934 | Squires | 72/370.03 X |
| 2,268,246 A | * | 12/1941 | Dooley | 72/370.03 |
| 3,324,981 A | * | 6/1967 | Aschauer | 192/70.2 |
| 3,429,172 A | * | 2/1969 | Lierse et al. | 72/361 X |
| 3,789,956 A | * | 2/1974 | Neugebauer | 74/468 X |
| 4,961,669 A | * | 10/1990 | Itoh et al. | 74/468 X |
| 5,829,911 A | * | 11/1998 | Yokota et al. | 72/359 X |
| 6,095,006 A | * | 8/2000 | Morita et al. | |
| 6,675,453 B2 | * | 1/2004 | Briggs | |
| 7,024,751 B2 | * | 4/2006 | Sefcik et al. | 192/70.2 |
| 7,100,464 B2 | * | 9/2006 | Gardin | 192/70.2 |
| 2001/0045140 A1 | * | 11/2001 | Kamminga et al. | 192/70.2 |

OTHER PUBLICATIONS

Society of Automotive Engineers, Inc. (SAE), Universal Joint and Driveshaft Design Manual, AE-7, Society of Automotive Engineers, Inc, Warrendale, PA, p. 188 and 189, TJ1079.S62, 1979.*
Universal Joint and Driveshaft Design Manual, AE-7, Society of Automotive Engineers, Inc, Wareendale, PA p. 185, TJ1079.S62 1979.*

* cited by examiner

*Primary Examiner*—Greg Binda

(57) ABSTRACT

A shaft assembly comprises an annular hub with a shaft extending therefrom. The hub and the shaft are integrally formed from a single forging, thereby reducing stress concentration locations within the assembly. The hub includes a circumferential wall having a wall thickness. A plurality of teeth protrude from the circumferential wall. Each of the plurality of teeth has a tooth thickness, with the tooth thickness being greater than the wall thickness. Splines are formed on an outer surface of the shaft. Preferably, the splines are induction hardened. A method of manufacturing the shaft assembly includes forging a base member and flow forming the base member into the hub and the shaft to create the shaft assembly. Next, the plurality of teeth are formed within the hub. Finally, the splines are formed on the shaft, and preferably induction hardened.

11 Claims, 2 Drawing Sheets

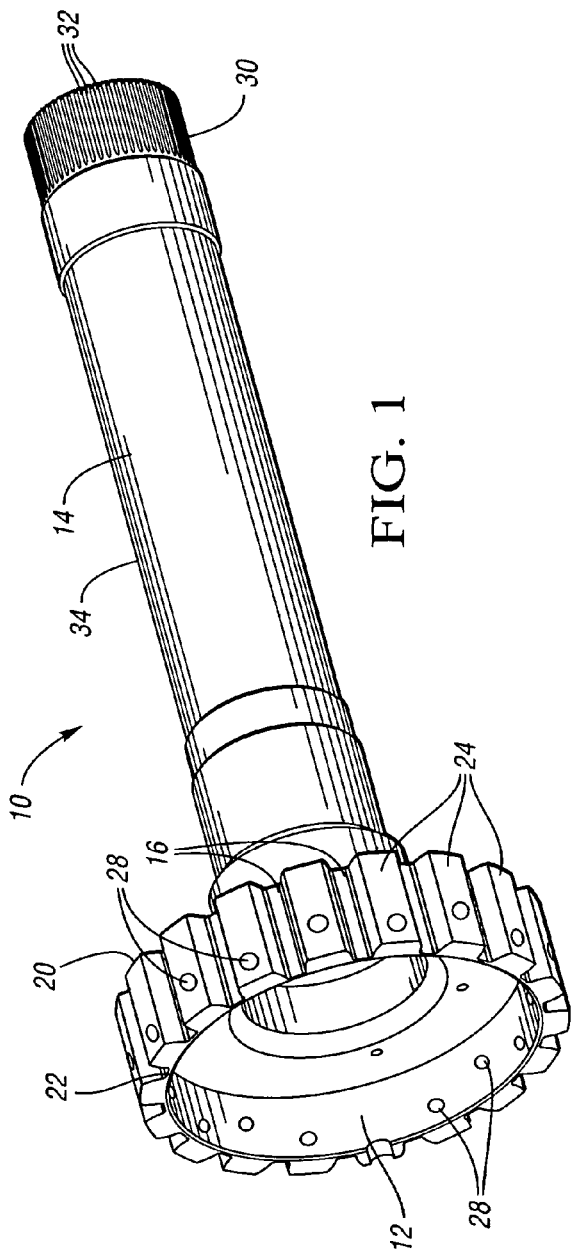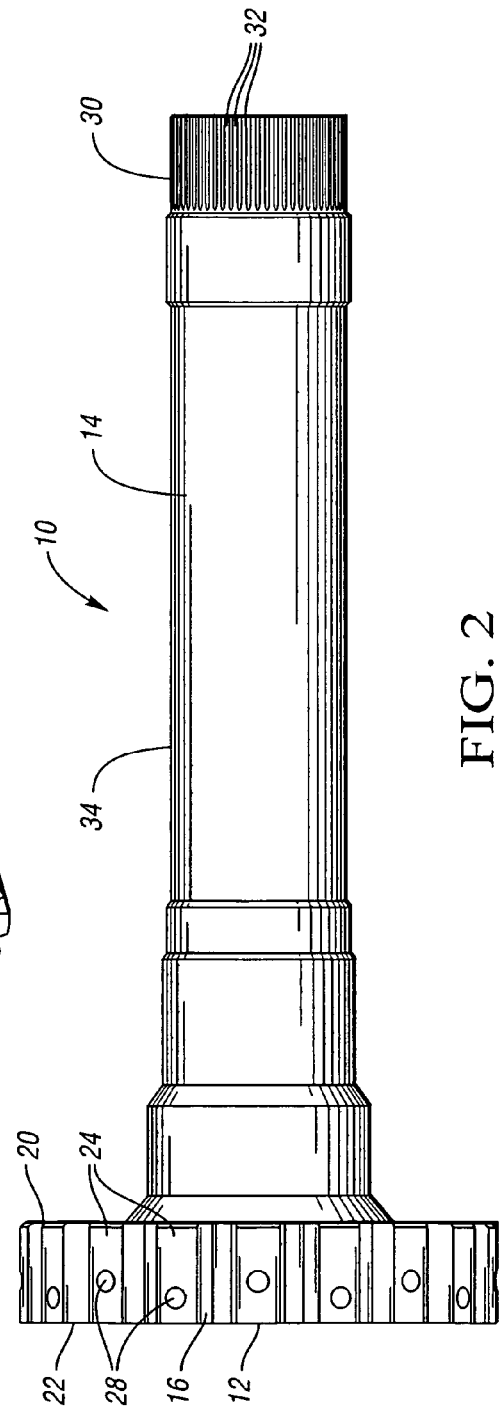

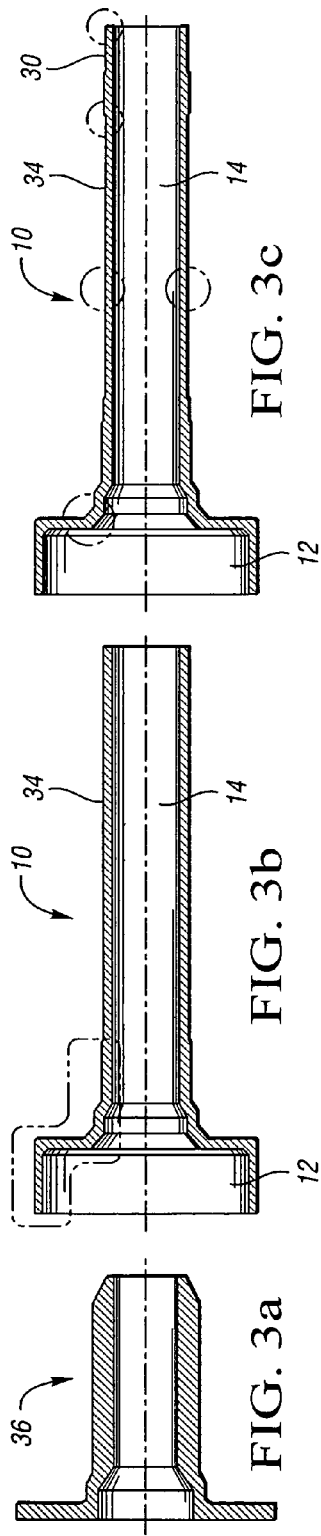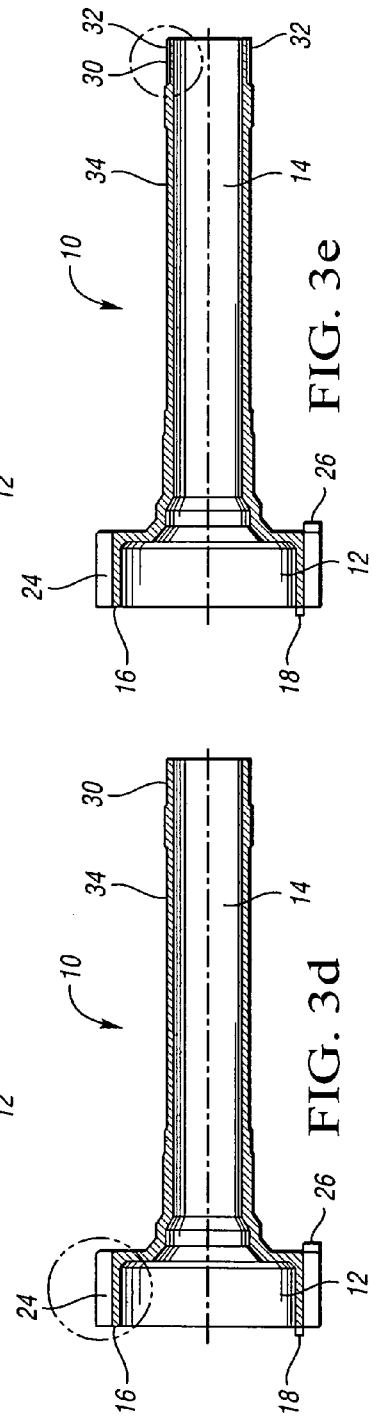

US 7,485,044 B2

SHAFT ASSEMBLY AND METHOD OF MANUFACTURE THEREOF

TECHNICAL FIELD

The present invention relates to torque transferring devices used within vehicle transmissions and, more particularly, to an improved shaft assembly and a method of manufacturing the improved shaft assembly.

BACKGROUND OF THE INVENTION

Clutch shafts for use in vehicle transmissions are well known in the art. Generally, a shaft extends from a clutch hub and supports a gear. A clutch selectively engages teeth formed within the clutch hub to selectively transfer torque between the clutch and the gear. Traditionally, the clutch hub and the shaft are separately formed, and then spun weld or otherwise joined together to create the clutch shaft. The clutch hub is usually formed by stamping, resulting in substantially U-shaped, non-solid teeth.

SUMMARY OF THE INVENTION

The present invention provides an improved shaft assembly comprising an annular hub with a shaft extending therefrom. The hub and the shaft are integrally formed from a single forging, thereby reducing stress concentration locations within the assembly. The hub includes a circumferential wall having a wall thickness. A plurality of teeth protrude from the circumferential wall. Each of the plurality of teeth is solid, and has a tooth thickness greater than the wall thickness. Splines are formed on an outer surface of the shaft. Preferably, the splines are induction hardened.

The present invention also provides a method of manufacturing the improved shaft assembly. A base member is forged from a single piece of steel. The base member is then flow formed into the hub and the shaft to create the shaft assembly. The shaft assembly may be contoured if necessary following flow forming. The plurality of teeth are then formed within the hub. Next, the splines are formed on the shaft, and preferably induction hardened.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective view of an improved shaft assembly according to the present invention;

FIG. 2 is a schematic side view of the improved shaft assembly of FIG. 1;

FIG. 3a shows a forged base member used to create the improved shaft assembly of FIG. 1;

FIG. 3b shows the improved shaft assembly following flow forming of the base member of FIG. 3a into a shaft and a hub;

FIG. 3c shows the improved shaft assembly following contouring;

FIG. 3d shows the improved shaft assembly following formation of a plurality of teeth within the hub;

FIG. 3e shows the improved shaft assembly following formation of splines on the shaft;

FIG. 3f shows the improved shaft assembly following formation of lubricant openings within the plurality of teeth; and FIG. 3g shows the improved shaft assembly following induction hardening of the splines.

DESCRIPTION OF THE PREFERRED EMBODIMENTS

Referring to FIGS. 1 and 2, an improved shaft assembly according to the present invention is shown at 10. The shaft assembly 10 comprises an annular hub 12 with a shaft 14 extending therefrom. The hub 12 and the shaft 14 are flow formed from a single forging as described below. In the preferred embodiment, the shaft assembly 10 is a fourth clutch shaft for a vehicle transmission. As such, the hub 12 is configured to be matable with a clutch, while the shaft 14 is configured to support a gear. However, it should be appreciated that the present invention may be used to transfer torque in a variety of applications without changing the inventive concept.

The hub 12 includes a circumferential wall 16 having a wall thickness 18 (shown in FIGS. 3d-3g) and defining a first edge 20 and a second edge 22. A plurality of teeth 24 protrude from the circumferential wall 16, preferably extending from the first edge 20 to the second edge 22 thereof. Each of the plurality of teeth 24 is preferably solid, and has a tooth thickness 26 (shown in FIGS. 3d-3g), defined as the distance between the circumferential wall 16 and an outer surface of the tooth 24. The tooth thickness 26 is preferably at least twice the wall thickness 18. The plurality of teeth 24 preferably extend about the entire perimeter of the circumferential wall 16. Lubricant openings 28 extend through at least some of the plurality of teeth 24 to allow lubricant to flow into and out of the shaft assembly 10. The hub 12 is preferably configured to engage the clutch within the vehicle transmission. When the clutch is applied, splined clutch plates tend to "peen" contact portions of the hub, namely the teeth; that is, the splined clutch plates leave indentations in the teeth, thereby reducing the useful life of the shaft assembly. Providing solid teeth 24 greatly reduces or even eliminates peening, thereby resulting in longer life of the shaft assembly 10.

The shaft 14 extends from the hub 12 to a spline end 30. Splines 32 are formed on an outer surface 34 of the shaft 14 at the spline end 30. In the preferred embodiment, the splines 32 extend around the entire outer surface 34 of the shaft 14. The splines 32 are preferably configured to support a gear, with the gear tending to cause degradation of the splines 32 over time. Preferably, the splines 32 are induction hardened following formation, thereby reducing spline degradation caused by the gear. In the preferred embodiment, the splines 32 are induction hardened to a Rockwell hardness of between 50 and 55 following formation. This specific Rockwell hardness range was chosen to correspond to the hardness of the gear generally used in practice. It should be noted, however, that the splines 32 may be induction hardened to a different Rockwell hardness without compromising the inventive concept.

The present invention also provides a method of manufacturing the improved shaft assembly 10 described herein. FIGS. 3a-3g depict various steps of the method, with the portion of the shaft assembly 10 modified in each step generally highlighted. FIG. 3a shows a base member 36 forged from a single piece of steel. The base member 36 is then flow formed into the hub 12 and the shaft 14, as shown in FIG. 3b. Flow forming the hub 12 and the shaft 14 from a single forging, i.e., the base member 36, greatly increases the overall strength of the shaft assembly 10 by eliminating stress concentration locations present in two-piece shaft assemblies which are spun-weld or otherwise joined together. The shaft assembly 10 preferably comprises steel having a Rockwell hardness between 65 and 70. However, a different material may be used without changing the inventive concept.

Turning to FIG. 3c, the shaft assembly 10 is next contoured as desired. The shaft assembly 10 may be contoured by any process known in the art, including, but not limited to, turning, broaching and deburring. Following contouring, the plurality of teeth 24 are formed within the hub 12, as depicted in FIG. 3d. The plurality of teeth 24 are preferably created by cutting into the hub 12, thereby defining the circumferential wall 16 as the portion of the hub 12 between each of the plurality of teeth 24. Hobbing, or any other cutting process known in the art, may be used to cut the plurality of teeth 24 from the hub 12 without changing the inventive concept.

As shown generally in FIG. 3e, next the splines 32 are formed on the outer surface 34 of the shaft 14. Preferably the splines 32 are formed by hobbing, but any cutting process known in the art may be used to create the splines 32. Turning to FIG. 3f, the lubricant openings 28 are then formed through at least some of the plurality of teeth 24, preferably by broaching. Finally, as illustrated in FIG. 3g, the splines 32 are induction hardened to the Rockwell hardness chosen for the specific application. Prior to shipping, the shaft assembly 10 is milled and polished as known in the art.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A shaft assembly comprising:
   an annular hub including a circumferential wall having a wall thickness;
   wherein said circumferential wall is cylindrical;
   a shaft extending from said hub, said hub and said shaft being integrally formed from a single forging, thereby eliminating stress concentration locations;
   wherein said shaft is hollow from said hub to an end of said shaft opposite said hub;
   a plurality of teeth integrally formed with said circumferential wall and protruding from said circumferential wall, with each of said plurality of teeth having a tooth thickness, said tooth thickness being greater than said wall thickness;
   wherein each of said plurality of teeth is solid;
   induction hardened splines formed on an outer surface of said shaft; and
   wherein said plurality of teeth and said induction hardened splines are formed after said single forging.

2. The shaft assembly of claim 1, wherein said splines are induction hardened to a Rockwell hardness of between 50 and 55.

3. The shaft assembly of claim 1, wherein said splines are formed at the end of said shaft opposite said hub.

4. The shaft assembly of claim 1, wherein said plurality of teeth are distributed about the periphery of said circumferential wall.

5. The shaft assembly of claim 1, wherein said tooth thickness is at least twice said wall thickness; and wherein said tooth thickness for each of said plurality of teeth is a distance between said circumferential wall and an outer surface of said each of said plurality of teeth.

6. The shaft assembly of claim 1, wherein said circumferential wall includes a first edge and a second edge, and wherein each of said plurality of teeth extends from said first edge to said second edge.

7. The shaft assembly of claim 1, wherein at least one of said plurality of teeth includes an opening through said at least one of said plurality of teeth and said circumferential wall into said annular hub, to allow lubricant into and out of said shaft assembly; and wherein said opening is formed after said single forging.

8. The shaft assembly of claim 1, wherein said hub and said shaft comprise steel having a Rockwell hardness of between 65 and 70.

9. A shaft assembly comprising:
   an annular hub including a circumferential wall defining first and second edges, said circumferential wall having a wall thickness;
   wherein said circumferential wall is cylindrical;
   a plurality of teeth integrally formed with said circumferential wall and protruding about the entire periphery of said circumferential wall and extending between said first and second edges, with each of said plurality of teeth having a tooth thickness, said tooth thickness being greater than said wall thickness;
   a shaft extending from said hub to a spline end, said hub and said shaft being flow formed from a single forging, thereby eliminating stress concentration locations;
   wherein said shaft is hollow from said hub to said spline end;
   splines formed on an outer surface of said shaft at said spline end, said splines being induction hardened to a Rockwell hardness of between 50 and 55; and
   wherein said plurality of teeth and said induction hardened splines are formed after said single forging.

10. A shaft assembly comprising:
    an annular hub including a circumferential wall having a wall thickness;
    wherein said circumferential wall is cylindrical;
    wherein said annular hub mates with a clutch;
    a plurality of teeth integrally formed with said circumferential wall and protruding from said circumferential wall, with each of said plurality of teeth having a tooth thickness, said tooth thickness being greater than said wall thickness;
    a shaft extending from said hub and configured to support a gear, said hub and said shaft being integrally formed from a single forging, thereby eliminating stress concentration locations;
    wherein said shaft is hollow from said hub to an end of said shaft opposite said hub;
    induction hardened splines formed on an outer surface of said shaft; and
    wherein said plurality of teeth and said induction hardened splines are formed after said single forging.

11. The shaft assembly of claim 10, wherein each of said plurality of teeth is solid.

* * * * *